(12) United States Patent
    Song (10) Patent No.: US 10,401,907 B2
(45) Date of Patent: Sep. 3, 2019

(54) DISPLAY APPARATUS HAVING A FLEXIBLE DISPLAY PANEL

(71) Applicant: BOE TECHNOLOGY GROUP CO., LTD., Beijing (CN)

(72) Inventor: Song Song, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 55 days.

(21) Appl. No.: 15/325,881

(22) PCT Filed: May 20, 2016

(86) PCT No.: PCT/CN2016/082865
    § 371 (c)(1),
    (2) Date: Jan. 12, 2017

(87) PCT Pub. No.: WO2016/202140
    PCT Pub. Date: Dec. 22, 2016

(65) Prior Publication Data
    US 2017/0177035 A1    Jun. 22, 2017

(30) Foreign Application Priority Data
    Jun. 16, 2015   (CN) .......................... 2015 1 0335013

(51) Int. Cl.
    *G06F 1/16*         (2006.01)
(52) U.S. Cl.
    CPC ............ *G06F 1/1652* (2013.01); *G06F 1/165* (2013.01); *G06F 1/1618* (2013.01)
(58) Field of Classification Search
    CPC ....... G06F 1/1652; G06F 1/1618; G06F 1/165
    See application file for complete search history.

(56) References Cited

U.S. PATENT DOCUMENTS

| 9,483,081 B2* | 11/2016 | Lee ...................... G06F 1/1616 |
| 2010/0064564 A1* | 3/2010 | Bemelmans .......... G06F 1/1601 |
| | | 40/607.01 |

(Continued)

FOREIGN PATENT DOCUMENTS

| CN | 101681183 A | 3/2010 |
| CN | 103093699 A | 5/2013 |

(Continued)

OTHER PUBLICATIONS

International Search Report & Written Opinion dated Jul. 26, 2016 regarding PCT/CN2016/082865.

(Continued)

*Primary Examiner* — William H. Mayo, III
*Assistant Examiner* — Hiram E Gonzalez
(74) *Attorney, Agent, or Firm* — Intellectual Valley Law, P.C.

(57) ABSTRACT

The present application discloses a display apparatus comprising a flexible display panel capable of undergoing deformation between a flat configuration in which the flexible display panel is substantially flat and a curved configuration in which the flexible display panel is curved; and a first arm section and a second arm section for deforming the flexible display panel between the flat configuration and the curved configuration. Each of the first arm section and the second arm section comprises a first terminal and a second terminal, the first terminal of the first arm section and the first terminal of the second arm section coupled to each other, and the second terminal of the first arm section and the second terminal of the second arm section coupled to the flexible display panel on a side distal to a light emitting surface of the flexible display panel and at two opposite margins of the flexible display panel, respectively; the first arm section is a retractable arm section capable of retracting and extending (Continued)

between the first terminal and the second terminal of the first arm section, having an extended state corresponding to the flexible display panel in a flat configuration and a retracted state corresponding to the flexible display panel in a curved configuration; and the second arm section is a retractable arm section capable of retracting and extending between the first terminal and the second terminal of the second arm section, having an extended state corresponding to the flexible display panel in the flat configuration and a retracted state corresponding to the flexible display panel in the curved configuration.

17 Claims, 5 Drawing Sheets

(56) References Cited

U.S. PATENT DOCUMENTS

| | | |
|---|---|---|
| 2012/0243206 A1 | 9/2012 | Wang et al. |
| 2013/0114193 A1 | 5/2013 | Joo |
| 2013/0329422 A1 | 12/2013 | Park et al. |
| 2014/0003006 A1 | 1/2014 | Ahn |
| 2014/0065326 A1 | 3/2014 | Lee |
| 2015/0023030 A1 | 1/2015 | Tsukamoto |
| 2015/0092361 A1 | 4/2015 | Cho et al. |
| 2015/0373863 A1 | 12/2015 | Lin et al. |

FOREIGN PATENT DOCUMENTS

| | | |
|---|---|---|
| CN | 103294113 A | 9/2013 |
| CN | 103489380 A | 1/2014 |
| CN | 103514812 A | 1/2014 |
| CN | 103559835 A | 2/2014 |
| CN | 104200753 A | 12/2014 |
| CN | 204130086 U | 1/2015 |
| CN | 104517557 A | 4/2015 |

OTHER PUBLICATIONS

First Office Action in the Chinese Patent Application No. 201510335013.9, dated Dec. 6, 2016; English translation attached.

Extended European search report in the European Patent Application No. 16810881.9, dated Jan. 9, 2019.

\* cited by examiner

DISPLAY APPARATUS HAVING A FLEXIBLE DISPLAY PANEL

CROSS-REFERENCE TO RELATED APPLICATION

This application is a national stage application under 35 U.S.C. § 371 of International Application No. PCT/CN2016/082865, filed May 20, 2016, which claims priority to Chinese Patent Application No. 201510335013.9, filed Jun. 16, 2015, the contents of which are incorporated by reference in the entirety.

TECHNICAL FIELD

The present invention relates to display technology, more particularly, to a display apparatus having a flexible display panel.

BACKGROUND

Portable display devices such as foldable and flexible display devices have become a focus of research and development in display technology in recent years. A flexible display device is a bendable or deformable display device having a flexible display panel. Examples of flexible display devices include a flexible organic light emitting display (OLED) device, a flexible electrophoretic display (EPD) device, and a flexible liquid crystal display (LCD) device. As a new generation display device, the flexible display device is thinner and tighter, having high contrast, high responsiveness, and high brightness. It also provides full color and a wide viewing angle. The flexible display device has found a wide range of applications in mobiles phones, personal digital assistance (PDAs), digital cameras, on-board displays, notebook computers, on-wall televisions, as well as various military applications. A flexible display device includes a flexible array substrate. A base substrate of the flexible array substrate can be made of flexible material such as plastic.

SUMMARY

In one aspect, the present invention provides a display apparatus comprising a flexible display panel capable of undergoing deformation between a flat configuration in which the flexible display panel is substantially flat and a curved configuration in which the flexible display panel is curved; and a first arm section and a second arm section for deforming the flexible display panel between the flat configuration and the curved configuration.

Optionally, each of the first arm section and the second arm section comprises a first terminal and a second terminal, the first terminal of the first arm section and the first terminal of the second arm section coupled to each other, and the second terminal of the first arm section and the second terminal of the second arm section coupled to the flexible display panel on a side distal to a light emitting surface of the flexible display panel and at two opposite margins of the flexible display panel, respectively; the first arm section is a retractable arm section capable of retracting and extending between the first terminal and the second terminal of the first arm section, having an extended state corresponding to the flexible display panel in a flat configuration and a retracted state corresponding to the flexible display panel in a curved configuration; and the second arm section is a retractable arm section capable of retracting and extending between the first terminal and the second terminal of the second arm section, having an extended state corresponding to the flexible display panel in the flat configuration and a retracted state corresponding to the flexible display panel in the curved configuration.

Optionally, the display apparatus further comprises at least one peripheral display panel abutting the flexible display panel along at least one edge of the flexible display panel.

Optionally, the first arm section and the second arm section constitute a folding arm for deforming the flexible display panel between the flat configuration and the curved configuration, the first arm section and the second arm section forming an included angle, the folding arm is capable of having a first included angle corresponding to the flexible display panel in the flat configuration and a second included angle corresponding to the flexible display panel in the curved configuration.

Optionally, the display apparatus further comprises an included angle controller for adjusting an included angle of the folding arm thereby deforming the flexible display panel.

Optionally, the included angle controller comprises a retractable shaft capable of having a retracted state corresponding to the flexible display panel in the flat configuration and an extended state corresponding to the flexible display panel in the curved configuration; the retractable shaft comprises a first end coupled to the first arm section and the second arm section, and a second end coupled to the flexible display panel at a side of the flexible display panel distal to a light emitting surface; the first terminals of the first arm section and the second arm section coupled to each other through the first end of the retractable shaft.

Optionally, the display apparatus further comprises at least one peripheral display panel abutting the flexible display panel along at least one edge of the flexible display panel, the flexible display panel and the at least one peripheral display panel are substantially planar when the first arm section and the second arm section are in an extended state.

Optionally, the flexible display panel is curved and has a partial cylindrical surface when the first arm section and the second arm section are in a retracted state.

Optionally, the display apparatus further comprises a protective shell facing the flexible display panel and covering the first end of the retractable shaft; the protective shell and the flexible display panel enclosing the folding arm and the retractable shaft when the flexible display panel is in the curved configuration.

Optionally, the display apparatus comprises a first peripheral display panel and a second peripheral display panel abutting the flexible display panel on two opposite edges of the flexible display panel in plan view of the flexible display panel, respectively; and a first supporting connector and a second supporting connector for connecting the first peripheral display panel and the second peripheral display panel when the flexible display panel in the curved configuration and for supporting the display apparatus on a surface when the flexible display panel in the flat configuration.

Optionally, the first supporting connector is in a margin portion of the first peripheral display panel distal to the flexible display panel, the second supporting connector is in a margin portion of the second peripheral display panel distal to the flexible display panel, and the first supporting connector and the second supporting connector are on a same surface of the display apparatus when the flexible display panel in the flat configuration.

Optionally, a light emitting surface of the flexible display panel is on a same side of the display apparatus as light emitting surfaces of the first peripheral display panel and the second peripheral display panel.

Optionally, a light emitting surface of the flexible display panel is on a different side of the display apparatus from light emitting surfaces of the first peripheral display panel and the second peripheral display panel.

Optionally, the display apparatus further comprises an ancillary folding arm comprising a third arm section and a fourth arm section for deforming the flexible display panel between the flat configuration and the curved configuration, the third arm section and the fourth arm section forming an additional included angle, the ancillary folding arm is capable of having a third included angle corresponding to the flexible display panel in the flat configuration and a fourth included angle corresponding to the flexible display panel in the curved configuration; the included angle controller controlling an included angle of the folding arm and an additional included angle of the ancillary folding arm simultaneously; the included angle controller comprising a retractable shaft capable of having a retracted state corresponding to the flexible display panel in the flat configuration and an extended state corresponding to the flexible display panel in the curved configuration, the retractable shaft comprises a first end coupled to the first arm section and the second arm section, and a second end coupled to the flexible display panel at a side of the flexible display panel distal to a light emitting surface; the first terminals of the first arm section and the second arm section coupled to each other through the first end of the retractable shaft Optionally, the folding arm comprises a first arm section and a second arm section, each of which having a first terminal and a second terminal, the first terminals coupled to the retractable shaft and the second terminals coupled to the flexible display panel on a side distal to a light emitting surface of the flexible display panel, the second terminal of the first arm section and the second terminal of the second arm section coupled to the flexible display panel at two opposite margins of the flexible display panel, respectively; the ancillary folding arm comprises a third arm section and a fourth arm section, each of which having a third terminal and a fourth terminal, the third terminals coupled to the retractable shaft and the fourth terminals coupled to the flexible display panel on a side distal to a light emitting surface of the flexible display panel, the fourth terminal of the third arm section and the fourth terminal of the fourth arm section coupled to the flexible display panel at two opposite margins of the flexible display panel, respectively; and the retractable shaft has a first end coupled to the first terminals of the first arm section and the second arm section; and a second end coupled to the third terminals of the third arm section and the fourth arm section, and the flexible display panel at a side of the flexible display panel distal to a light emitting surface.

Optionally, the display apparatus further comprises a flexible shell facing the flexible display panel and covering the first end of the retractable shaft; the flexible shell and the flexible display panel enclosing the folding arm, the ancillary folding arm, and the retractable shaft when the flexible display panel is in the curved configuration, the flexible shell capable of undergoing deformation between a flat configuration in which the flexible shell is substantially flat and a curved configuration in which the flexible shell is curved; the flat configuration of the flexible shell corresponding to the flat configuration of the flexible display panel, the curved configuration of the flexible shell corresponding to the curved configuration of the flexible display panel; the folding arm comprises a first arm section and a second arm section, each of which having a first terminal and a second terminal, the first terminal coupled to the retractable shaft and the second terminal coupled to the flexible display panel on a side distal to a light emitting surface of the flexible display panel, the second terminals of the first arm section and the second arm section coupled to the flexible display panel at two opposite margins of the flexible display panel, respectively; the ancillary folding arm comprises a third arm section and a fourth arm section, each of which having a third terminal and a fourth terminal, the third terminal coupled to the retractable shaft and the fourth terminal coupled to the flexible shell, the fourth terminals of the third arm section and the fourth arm section coupled to the flexible shell at two opposite margins of the flexible shell, respectively; and the retractable shaft has a first end coupled to the first terminals of the first arm section and the second arm section, and the flexible shell on a side proximal to the flexible display panel; and a second end coupled to the third terminals of the third arm section and the fourth arm section, and the flexible display panel at a side of the flexible display panel distal to a light emitting surface.

Optionally, the first terminals of the first arm section and the second arm section coupled to the retractable shaft by attaching to portions of the flexible shell proximal to the retractable shaft.

Optionally, the third terminals of the third arm section and the fourth arm section coupled to the retractable shaft by attaching to portions of the flexible display panel proximal to the retractable shaft on a side distal to the light emitting surface of the flexible display panel.

Optionally, the display apparatus further comprises at least one peripheral display panel abutting the flexible display panel along at least one edge of the flexible display panel, wherein the at least one peripheral display panel comprises a peripheral backplate on a side distal to a light emitting surface of the at least one peripheral display panel, the flexible shell connected to the at least one peripheral backplate.

Optionally, the flexible display panel comprises a flexible backplate on a side distal to the light emitting surface of the flexible display panel.

Optionally, the at least one peripheral display panel is a flexible display panel.

Optionally, the at least one peripheral display panel is a rigid display panel.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

The present disclosure provides a novel display apparatus having an architecture that enables a user to switch the display apparatus among several structural configurations and functional modules associated therewith, e.g., switching between a smartphone to a tablet computer.

In some embodiments, the display apparatus includes a flexible display panel capable of undergoing deformation between a flat configuration in which the flexible display panel is substantially flat and a curved configuration in which the flexible display panel is curved. The flexible display panel is capable of undergoing deformation between a flat configuration in which the flexible display panel is substantially flat and a curved configuration in which the flexible display panel is curved. The flexible display panel may be of any appropriate shape. For example, the flexible display panel may be of rectangular/square shape. Alternatively, the flexible display panel may be a circle or of elliptical shape.

Optionally, the flexible display panel is a central flexible display panel having at least one peripheral display panel abutting the central flexible display panel along at least one edge of the central flexible display panel.

In some embodiments, the display apparatus includes a central flexible display panel, at least one peripheral display panel, a driving mechanism for deforming the central flexible display panel between a flat configuration and a curved configuration. The central flexible display panel is capable of undergoing deformation between a flat configuration in which the central flexible display panel is substantially flat and a curved configuration in which the central flexible display panel is curved. The at least one peripheral display panel abuts the central flexible display panel along at least one edge of the central flexible display panel in plan view of the central flexible display panel. For example, the display apparatus may include two peripheral display panels abutting the central flexible display panel along two opposite edges of the central flexible display panel in plan view of the central flexible display panel. The central flexible display panel may be of any appropriate shape. For example, the central flexible display panel may be of rectangular/square shape, and two peripheral display panels abuts two opposite sides of the rectangle/square. Alternatively, the central flexible display panel may be a circle or of elliptical shape, the two peripheral display panels abuts two arcs of the circle/ellipse.

In some embodiments, the display apparatus includes a flexible display panel and a driving mechanism for deforming the flexible display panel between a flat configuration and a curved configuration. In some embodiments, the driving mechanism is a pair of a first arm section and a second arm section for deforming the flexible display panel between the flat configuration and the curved configuration.

The driving mechanism may be an extension-type mechanism or a folding-type mechanism or a combination thereof.

In some embodiments, the driving mechanism is an extension-type mechanism. For example, each of the first arm section and the second arm section may include a first terminal and a second terminal. The first terminal of the first arm section and the first terminal of the second arm section are coupled to each other, either directly or through another object (e.g., a shaft such as a retractable shaft, or a protective shell), so that the first terminal of the first arm section and the first terminal of the second arm section are fixed relative to each other. The second terminal of the first arm section and the second terminal of the second arm section are coupled to the flexible display panel. Optionally, the second terminal of the first arm section and the second terminal of the second arm section coupled to the flexible display panel on a side distal to a light emitting surface of the flexible display panel and at two opposite margins of the flexible display panel, respectively.

In an extension-type driving mechanism, optionally the first arm section is a retractable arm section capable of retracting and extending between the first terminal and the second terminal of the first arm section, having an extended state corresponding to the flexible display panel in a flat configuration and a retracted state corresponding to the flexible display panel in a curved configuration; and optionally the second arm section is a retractable arm section capable of retracting and extending between the first terminal and the second terminal of the second arm section, having an extended state corresponding to the flexible display panel in the flat configuration and a retracted state corresponding to the flexible display panel in the curved configuration.

In some embodiments, the driving mechanism is a folding-type mechanism. For example, in some embodiments, the driving mechanism includes a folding arm having a first arm section and a second arm section for deforming the flexible display panel (e.g., a central flexible display panel) between the flat configuration and the curved configuration. The first arm section and the second arm section form an included angle between two arm sections. The folding arm is capable of having a first included angle corresponding to the flexible display panel (e.g., a central flexible display panel) in the flat configuration and a second included angle corresponding to the flexible display panel (e.g., a central flexible display panel) in the curved configuration. Depending on the design of the folding arm, any appropriate included angle may be used. For example, the first included angle may be in the range of about 40 degree to about 150 degree, and the second included angle may be in the range of about 70 degree to about 175 degree. Optionally, the first included angle is in the range of about 50 degree to about 120 degree, e.g., about 50 degree to about 90 degree, about 90 degree to about 120 degree, or about 75 degree to about 100 degree. Optionally, the second included angle is in the range of about 80 degree to about 165 degree, e.g., about 80 degree to about 120 degree, about 120 degree to about 165 degree, or about 100 degree to about 140 degree.

Any appropriate shape and/or dimension may be used for making the folding arm. For example, the first arm section and the second arm section may be a rod, a tube, a plate, or a block. Optionally, the first arm section or the second arm section is a plate extending along one dimension of the flexible display panel (e.g., a central flexible display panel). Optionally, the driving mechanism includes a pair of folding arms, or a plurality of folding arms.

In some embodiments, the driving mechanism further includes an included angle controller for adjusting an included angle of the folding arm thereby deforming the flexible display panel (e.g., a central flexible display panel). Any appropriate included angle controller may be used for controlling the included angle. For example, the controller may be a mechanical controller, an electrical controller, or a combination thereof.

In some embodiments, the included angle controller includes a retractable shaft capable of having a retracted state corresponding to the flexible display panel (e.g., a central flexible display panel) in the flat configuration and an extended state corresponding to the flexible display panel (e.g., a central flexible display panel) in the curved configuration. The positions of the folding arm and the retractable shaft may be fixed upon user demand in the retracted state or the extended state. Optionally, the included angle controller further includes a tubular housing. Optionally, the retractable shaft has a first end coupled to the first arm section and the second arm section, and a second end coupled to the flexible display panel (e.g., a central flexible display panel) at a side of the flexible display panel distal to a light emitting surface.

Each of the first arm section of the second arm section has a first terminal and a second terminal. In some embodiments, the first terminals are coupled to the retractable shaft at the first end, e.g., by connected to the retractable shaft directly or by connected to a part of the display apparatus proximal to the first end of the retractable shaft. Optionally, the second terminals are coupled to the flexible display panel (e.g., a central flexible display panel) on a surface distal to a light emitting surface of the flexible display panel, e.g., by directly connected to the flexible display panel (e.g., in the middle of the flexible display panel), or by connected to a part of the display apparatus proximal to the flexible display panel. Optionally, the second terminal of the first arm section and the second terminal of the second arm section are coupled to the flexible display panel (e.g., a central flexible display panel) at two opposite margins of the flexible display panel, respectively. Each of the margins is adjacent to a peripheral display panel abutting the central flexible display panel.

In some embodiments, the first arm section and the second arm section are rigid arm sections that are not retractable (or extendable). In this design, the configuration of the flexible display panel (e.g., a central flexible display panel) are adjusted solely based on adjusting the included angle.

In some embodiments, the driving mechanism is a combination of an extension-type mechanism and a folding-type mechanism. In some embodiments, the first arm section and the second arm section of the folding arm are retractable (or extendable) arm sections. In this design, the configuration of the flexible display panel (e.g., a central flexible display panel) are adjusted based on adjusting both the included angle and the retraction/extension of the arm sections. Optionally, the first arm section is a retractable arm section capable of retracting and extending between the first terminal and the second terminal of the first arm section, having an extended state corresponding to the flexible display panel (e.g., a central flexible display panel) in the flat configuration and a retracted state corresponding to the flexible display panel in the curved configuration. Optionally, the second arm section is a retractable arm section capable of retracting and extending between the first terminal and the second terminal of the second arm section, having an extended state corresponding to the flexible display panel (e.g., a central flexible display panel) in the flat configuration and a retracted state corresponding to the flexible display panel in the curved configuration.

Optionally, the central flexible display panel and the at least one peripheral display panel are substantially planar when the first arm section and the second arm section are in an extended state. Optionally, the flexible display panel (e.g., a central flexible display panel) is curved and has a substantially cylindrical surface or a partial cylindrical surface when the first arm section and the second arm section are in a retracted state.

In some embodiments, the display apparatus further includes a protective shell facing the flexible display panel (e.g., a central flexible display panel) and covering the first end of the retractable shaft. Optionally, the protective shell and the flexible display panel enclose the folding arm and the retractable shaft when the flexible display panel is in the curved configuration.

In some embodiments, the display apparatus further includes a plurality of supporting connectors for connecting the first peripheral display panel and the second peripheral display panel when the central flexible display panel in the curved configuration and for supporting the display apparatus on a surface when the central flexible display panel in the flat configuration. For example, the display apparatus may include a first peripheral display panel and a second peripheral display panel abutting the central flexible display panel on two opposite edges of the central flexible display panel in plan view of the central flexible display panel, respectively; a first supporting connector, and a second supporting connector. The first supporting connector is in a margin portion of the first peripheral display panel distal to the central flexible display panel, the second supporting connector is in a margin portion of the second peripheral display panel distal to the central flexible display panel. The first supporting connector and the second supporting connector are on a same surface of the display apparatus when the central flexible display panel in the flat configuration.

Optionally, a light emitting surface of the central flexible display panel and a light emitting surface of the peripheral display panel are on a same side of the display apparatus. Optionally, a light emitting surface of the central flexible display panel and a light emitting surface of the peripheral display panel are on different sides of the display apparatus.

Various alternative embodiments may be practiced to make and use the driving mechanism. In some embodiments, the driving mechanism includes a retractable shaft capable of having a retracted state corresponding to the flexible display panel (e.g., a central flexible display panel) in the flat configuration and an extended state corresponding to the flexible display panel in the curved configuration. Optionally, the retractable shaft has a first end coupled to the first arm section and the second arm section, and a second end coupled to the flexible display panel (e.g., a central flexible display panel) at a side of the flexible display panel distal to a light emitting surface. The driving mechanism further includes a folding arm having a first arm section and a second arm section. Each of the first arm section of the second arm section has a first terminal and a second terminal. In some embodiments, the first terminals are coupled to the retractable shaft at the second end, e.g., by connected to the retractable shaft directly or by connected to a part of the display apparatus proximal to the second end of the retractable shaft. Optionally, the second terminals are coupled to the flexible display panel (e.g., a central flexible display panel) on a side distal to a light emitting surface of the flexible display panel, e.g., by directly connected to the flexible display panel (e.g., at a central portion of the flexible display panel), or by connected to a part of the display apparatus proximal to the flexible display panel. Optionally, the second terminal of the first arm section and the second terminal of the second arm section are coupled to the flexible display panel (e.g., a central flexible display panel) at two opposite margins of the flexible display panel, respectively. Each of the margins is adjacent to a peripheral display panel abutting the central flexible display panel.

In some embodiments, the display apparatus further includes an ancillary folding arm having a third arm section and a fourth arm section for deforming the flexible display panel (e.g., a central flexible display panel) between the flat configuration and the curved configuration. The third arm section and the fourth arm section form an additional included angle. The ancillary folding arm is capable of having a third included angle corresponding to the flexible display panel (e.g., a central flexible display panel) in the flat configuration and a fourth included angle corresponding to the flexible display panel in the curved configuration.

In some embodiments, the display apparatus further includes an additional included angle controller for separately controlling the additional included angle of the ancillary folding arm. In some embodiments, the folding arm and the ancillary folding arm share a same included angle controller. For example, the display apparatus include a same included angle controller for controlling an included angle of the folding arm and an additional included angle of the ancillary folding arm simultaneously. Optionally, the included angle controller includes a retractable shaft capable of having a retracted state corresponding to the flexible display panel (e.g., a central flexible display panel) in the flat configuration and an extended state corresponding to the flexible display panel in the curved configuration. The positions of the folding arm, the ancillary folding arm, and the retractable shaft may be fixed upon user demand in the retracted state or the extended state. Optionally, the included angle controller further includes a tubular housing. Optionally, the retractable shaft has a first end coupled to the first arm section and the second arm section, and a second end coupled to the flexible display panel (e.g., a central flexible display panel) at a side of the flexible display panel distal to a light emitting surface.

In some embodiments, the folding arm includes a first arm section and a second arm section. Each of the first arm section of the second arm section has a first terminal and a second terminal. In some embodiments, the first terminals are coupled to the retractable shaft at the first end, e.g., by connected to the retractable shaft directly or by connected to a part of the display apparatus proximal to the first end of the retractable shaft. Optionally, the second terminals are coupled to the flexible display panel (e.g., a central flexible display panel) on a side distal to a light emitting surface of the flexible display panel, e.g., by directly connected to the flexible display panel (e.g., at a central portion of the flexible display panel), or by connected to a part of the display apparatus proximal to the flexible display panel. Optionally, the second terminal of the first arm section and the second terminal of the second arm section are coupled to the flexible display panel (e.g., a central flexible display panel) at two opposite margins of the flexible display panel, respectively. Each of the margins is adjacent to a peripheral display panel abutting the central flexible display panel.

In some embodiments, the ancillary folding arm includes a third arm section and a fourth arm section. Each of the third arm section and the fourth arm section has a first terminal and a second terminal. In some embodiments, the first terminals are coupled to the retractable shaft at the second end, e.g., by connected to the retractable shaft directly or by connected to a part of the display apparatus proximal to the second end of the retractable shaft. Optionally, the second terminals are coupled to the flexible display panel (e.g., a central flexible display panel) on a side distal to a light emitting surface of the flexible display panel, e.g., by directly connected to the flexible display panel (e.g., at a central portion of the flexible display panel), or by connected to a part of the display apparatus proximal to the flexible display panel. Optionally, the second terminal of the third arm section and the second terminal of the fourth arm section are coupled to the flexible display panel (e.g., a central flexible display panel) at two opposite margins of the flexible display panel, respectively. Each of the margins is adjacent to a peripheral display panel abutting the central flexible display panel.

Optionally, the retractable shaft has a first end coupled to the first terminals of the first arm section and the second arm section. Optionally, the retractable shaft has a second end coupled to the third terminals of the third arm section and the fourth arm section, and the flexible display panel (e.g., a central flexible display panel) at a side of the flexible display panel distal to a light emitting surface.

In some embodiments, the display apparatus further includes a flexible shell facing the flexible display panel (e.g., a central flexible display panel) and covering the first end of the retractable shaft. Optionally, the flexible shell and the flexible display panel enclose the folding arm, the ancillary folding arm, and the retractable shaft when the flexible display panel is in the curved configuration. The flexible shell capable of undergoing deformation between a flat configuration in which the flexible shell is substantially flat and a curved configuration in which the flexible shell is curved. The flat configuration of the flexible shell corresponds to the flat configuration of the flexible display panel (e.g., a central flexible display panel), the curved configuration of the flexible shell corresponds to the curved configuration of the flexible display panel.

In some embodiments, the folding arm includes a first arm section and a second arm section. Each of the first arm section of the second arm section has a first terminal and a second terminal. In some embodiments, the first terminals are coupled to the retractable shaft at the first end, e.g., by connected to the retractable shaft directly or by connected to a part of the display apparatus proximal to the first end of the retractable shaft. Optionally, the second terminals are coupled to the flexible display panel (e.g., a central flexible display panel) on a side distal to a light emitting surface of the flexible display panel, e.g., by directly connected to the flexible display panel (e.g., at a central portion of the flexible display panel), or by connected to a part of the display apparatus proximal to the flexible display panel. Optionally, the second terminal of the first arm section and the second terminal of the second arm section are coupled to the flexible display panel (e.g., a central flexible display panel) at two opposite margins of the flexible display panel, respectively. Each of the margins is adjacent to a peripheral display panel abutting the central flexible display panel.

In some embodiments, the ancillary folding arm includes a third arm section and a fourth arm section. Each of the third arm section and the fourth arm section has a first terminal and a second terminal. In some embodiments, the first terminals are coupled to the retractable shaft at the second end, e.g., by connected to the retractable shaft directly or by connected to a part of the display apparatus proximal to the second end of the retractable shaft. Optionally, the second terminals are coupled to the flexible shell, e.g., by directly connected to the flexible shell (e.g., at a central portion of the flexible shell), or by connected to a part of the display apparatus proximal to the flexible shell. Optionally, the second terminal of the third arm section and the second terminal of the fourth arm section are coupled to the flexible shell at two opposite margins of the flexible shell, respectively. Each of the margins is adjacent to a peripheral display panel abutting the flexible shell.

Optionally, the retractable shaft has a first end coupled to the first terminals of the first arm section and the second arm section, and the flexible shell on a side proximal to the flexible display panel (e.g., a central flexible display panel). Optionally, the retractable shaft has a second end coupled to the third terminals of the third arm section and the fourth arm section, and the flexible display panel (e.g., a central flexible display panel) at a side of the flexible display panel distal to a light emitting surface.

Optionally, the first terminals of the first arm section and the second arm section are coupled to the retractable shaft by attaching to portions of the flexible shell proximal to the retractable shaft.

Optionally, the third terminals of the third arm section and the fourth arm section coupled with the retractable shaft by attaching to portions of the flexible display panel (e.g., a central flexible display panel) proximal to the retractable shaft on a side distal to the light emitting surface of the flexible display panel.

In some embodiments, the peripheral display panel includes a peripheral backplate on a side distal to a light emitting surface of the peripheral display panel. Optionally, the flexible shell is connected to the peripheral backplate.

In some embodiments, the flexible display panel (e.g., a central flexible display panel) includes a flexible backplate (e.g., a central flexible backplate) on a side distal to the light emitting surface of the flexible display panel.

One or more of the peripheral display panels may be a flexible display panel or a rigid display panel.

Optionally, the flexible display panel (e.g., a central flexible display panel) is curved in one dimension in the curved configuration.

Optionally, the flexible display panel (e.g., a central flexible display panel) is curved in two dimension in the curved configuration.

FIGS. 1-10 are diagrams illustrating some display apparatuses in sonic embodiments. Referring to FIGS. 1-10, the display apparatus in the embodiments includes a plurality of display panels serially connected. In some embodiments, the plurality of display panels include a central flexible display panel 100 and a peripheral display panel 200. Optionally, the plurality of display panels include two peripheral display panels 200 and a central flexible display panel 100 between the two peripheral display panels 200. The display apparatus further includes a driving mechanism 300 capable of deforming the central flexible display panel 100. For example, the driving mechanism 300 is capable of keeping the central flexible display panel 100 in a flat configuration in which the central flexible display panel is substantially flat, or in a curved configuration in which the central flexible display panel is curved.

Accordingly, the display apparatus has at least two operating states, the first of which corresponding to the flat configuration (see, e.g., FIGS. 2, 4, and 10) and the second of which corresponding to the curved configuration of the central flexible display panel (see, e.g., FIGS. 1, 3, 5, 6, 7, 8, and 9).

Two operating states of the display apparatus can be tailored for different user needs under different working environment. For example, the display apparatus in the first operating state may be suitable for use as a tablet computer having larger display area. The display apparatus in the second operating state, on the other hand, may be suitable for applications that demand higher portability, e.g., a smartphone.

Figure 1:
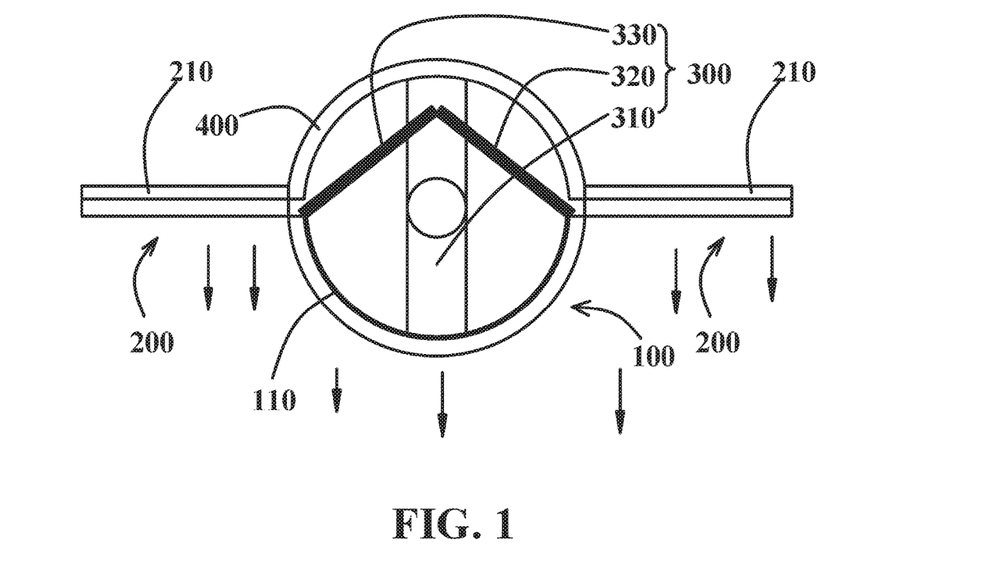
FIG. 1 is a diagram illustrating a display apparatus in a first configuration in some embodiments.
Figure 2:
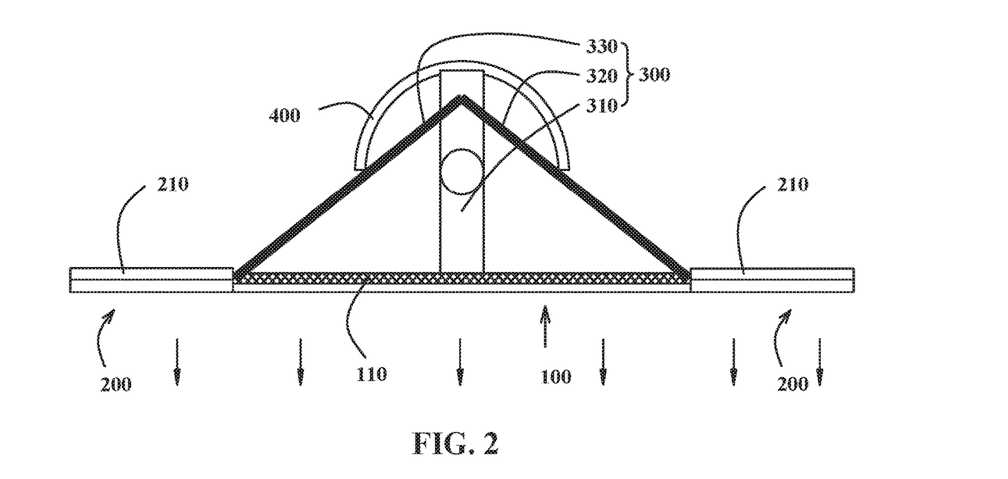
FIG. 2 is a diagram illustrating a display apparatus in a second configuration in some embodiments.

Any appropriate driving mechanism 300 may be used in the present display apparatus for deforming the central flexible display panel between the flat configuration and the curved configuration. Referring to FIGS. 1 and 2, the driving mechanism 300 in the embodiment includes a folding arm having a first arm section 320 and a second arm section 330 and an included angle controller. The included angle controller includes a retractable shall 310 capable of having a retracted state corresponding to the central flexible display panel in the flat configuration and an extended state corresponding to the central flexible display panel in the curved configuration. The retractable shaft 310 has a first end and a second end, the first end coupled to the central flexible display panel 100 at a side of the central flexible display panel 100 distal to its light emitting surface. The first arm section 320 has a first terminal coupled to the retractable shaft 310 and the second terminal coupled to a side of the central flexible display panel 100. The second arm section 330 has a first terminal coupled to the retractable shaft 310 and the second terminal coupled to a side of the central flexible display panel 100. The second terminals of the first arm section 320 and the second arm section 330 are coupled to the central flexible display panel 100 at two different (e.g., opposite) margins of the central flexible display panel 100, respectively. Optionally, the first arm section 320 and the second arm section 330 are retractable arm sections, capable of retracting and extending between the first terminal and the second terminal, having an extended state corresponding to the central flexible display panel in the flat configuration and a retracted state corresponding to the central flexible display panel in the curved configuration. Optionally, the first arm section 320 and the second arm section 330 are non-retractable arm sections.

Referring to FIG. 1, the first arm section 320 and the second arm section 330 in the embodiment are in a retracted state. In the retracted state, the distance between the second terminals of the first arm section 320 and the second arm section 330 is less than the width of the central flexible display panel 100 in the curved configuration. As discussed above, the curved configuration of the central flexible display panel 100 may be achieved by adjusting the included angle of the folding arm and the positions of the first arm section 320 and the second arm section 330 using the retractable shaft 310.

Similarly, the flat configuration of the central flexible display panel 100 may be achieved by adjusting the included angle of the folding arm and the positions of the first arm section 320 and the second arm section 330 using the retractable shaft 310. Specifically, the included angle of the folding arm may be adjusted such that the first arm section 320 and the second arm section 330 are in an extended state. In the flat configuration, the central flexible display panel 100 and the peripheral display panel 200 are substantially planar.

Any appropriate method may be used for driving the extension and/or retraction of the retractable shaft 310, the first arm section 320, and the second arm section 330. For example, they may be extended or retracted manually. Optionally, the extension and retraction may be driven by a motor.

In some embodiments, the first arm section 320 and the second arm section 330 are in a retracted state, and the central flexible display panel 100 is in a curved configuration. Optionally, the central flexible display panel 100 has a substantially cylindrical surface or a partial cylindrical surface.

Figure 8:
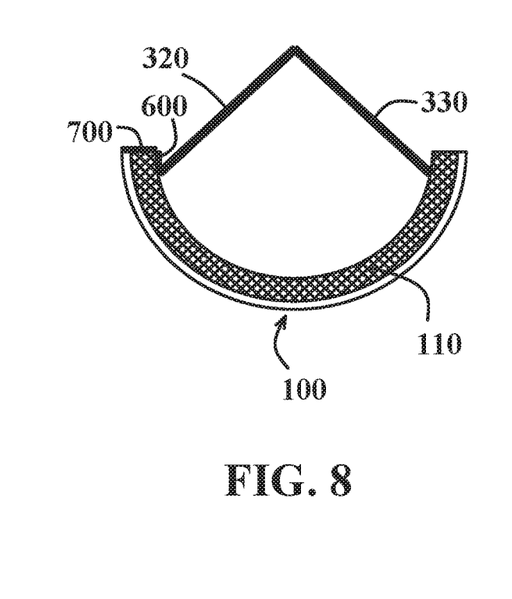
FIG. 8 is diagram illustrating a display apparatus in a first configuration in some embodiments.

FIG. 8 is diagram illustrating a display apparatus in a first configuration in some embodiments. Referring to FIG. 8, the second terminals of the first arm section 320 and the second arm section 330 are coupled to the central flexible display panel 100 at two different (e.g., opposite) margins of the central flexible display panel 100, respectively. The second terminals are not connected to the edges of the central flexible display panel 100. Rather, the second terminals are connected to the side surface of the central flexible display panel 100 proximal to the edges, respectively. As shown in FIG. 8, additional components such as a gate driving circuit 600 and a fanout area 700 may be disposed in the area between the second terminals and the edges.

Referring to FIGS. 1-2, the display apparatuses in the embodiments further include a protective shell 400. The protective shell 400 faces the central flexible display panel 100, covering the driving mechanism 300. As shown in FIG. 1, the protective shell 400 and the central flexible display panel 100 encloses the driving mechanism 300 (e.g., the folding arm and the retractable shaft 310) when the central flexible display panel 100 is in the curved configuration. Thus, the protective shell 400 is capable of protecting the driving mechanism 300 from external damages when the central flexible display panel 100 is in the curved configuration.

When the central flexible display panel 100 is in the flat configuration, the protective shell 400 moves relative to the central flexible display panel 100 and the peripheral display panel 200 in a direction away from the central flexible display panel 100 and the peripheral display panel 200. As shown in FIG. 2, the protective shell 400 may be used as a stand supporting the display apparatus. For example, the display apparatus may be placed on a desk top, using the protective shell 400 and edges of the plurality of display panels as support. This structure thus provides a user friendly design greatly enhancing convenience and user viewing experience.

In some embodiments, the width of the central flexible display panel 100 is no less than that of the peripheral display panel 200 (e.g., the sum of widths of the two peripheral display panels 200).

Figure 3:
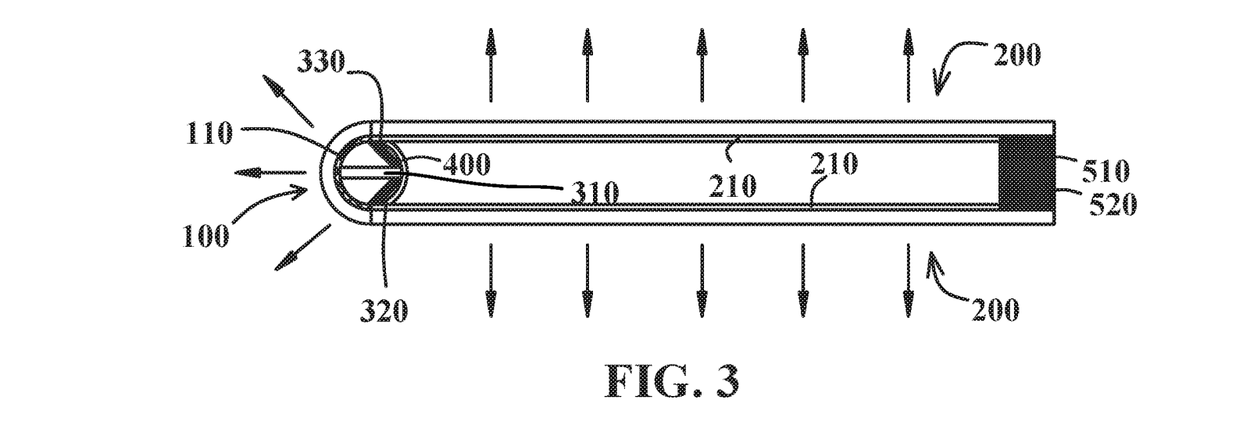
FIG. 3 is a diagram illustrating a display apparatus in a first configuration in some embodiments.
Figure 4:
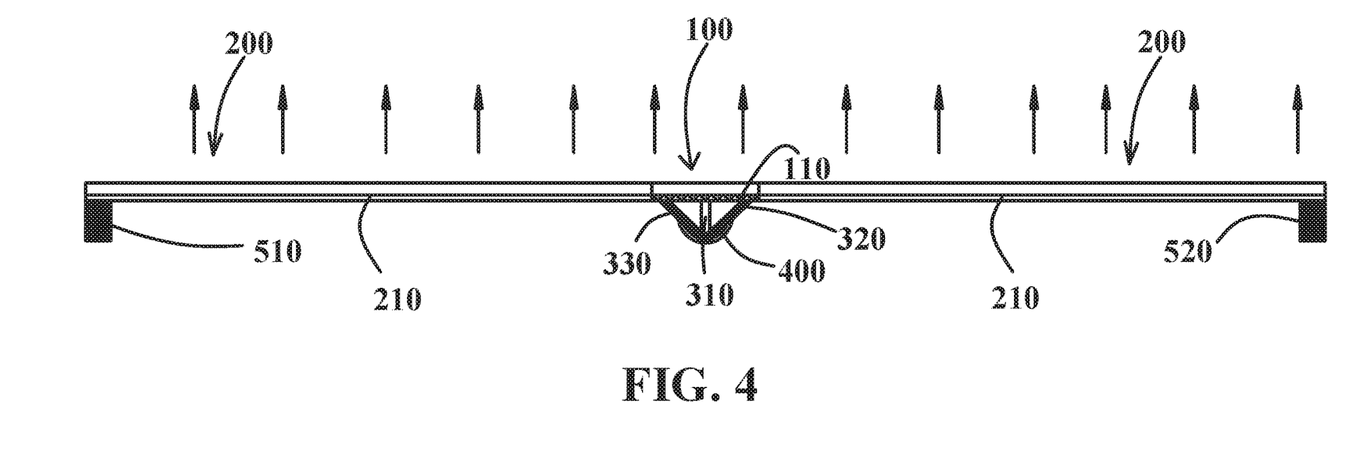
FIG. 4 is a diagram illustrating a display apparatus in a second configuration in some embodiments.

FIGS. 3-7 are diagrams illustrating some display apparatuses in some embodiments. Referring to FIG. 4, the display apparatus in the embodiment includes a first peripheral display panel 200 and a second peripheral display panel 200 abutting two opposite edges of the central flexible display panel 100, respectively. The display apparatus in FIG. 4 further includes a first supporting connector 510 in a margin portion of the first peripheral display panel 200 distal to the central flexible display panel 100, and a second supporting connector 520 in a margin portion of the second peripheral display panel 200 distal to the central flexible display panel 100. The first supporting connector 510 and the second supporting connector 520 are on a same side of the display apparatus.

As shown in FIGS. 3, 4, 6, and 7, the first supporting connector 510 and the second supporting connector 520 are on a side of the display apparatus distal to the light emitting surface of the display apparatus.

When the central flexible display panel in the flat configuration, the first supporting connector 510 and the second supporting connector 520 support the display apparatus on a surface, e.g., a desk top.

Optionally, the width of the central flexible display panel 100 is no more than half that of any one of the peripheral display panel 200 (e.g., the first peripheral display panel 200 or the second peripheral display panel 200). When the central flexible display panel 100 is in the curved configuration, the first supporting connector 510 and the second supporting connector 520 connect the first peripheral display panel 200 and the second peripheral display panel 200, forming a ring structure, e.g., a flat ring shaped structure as shown in FIG. 3. In this operating state, the display apparatus has three light emitting surfaces available far viewing, and has the advantage of being more portable.

In FIGS. 3-4, the tight emitting surface of the central flexible display panel 100 and the light emitting surface of the peripheral display panel 200 are on a same side of the display apparatus. As shown in FIGS. 3-4, all light emitting surfaces are exposed externally.

Figure 6:
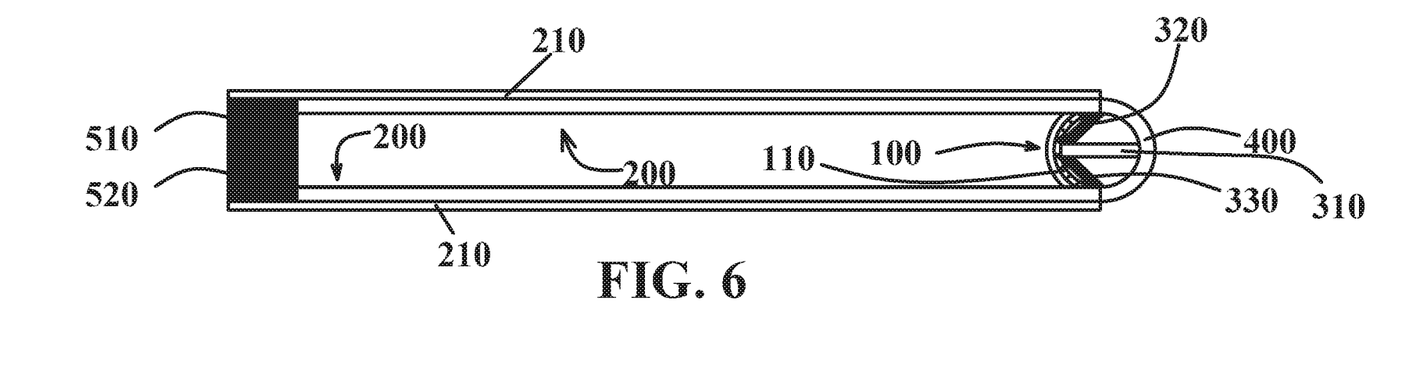
FIG. 6 is a diagram illustrating a display apparatus in a fourth configuration in some embodiments.

Alternative, the light emitting surfaces may be enclosed internally within the display apparatus in certain operating state. For example, when the display apparatus is not in use, it is desired to have all light emitting surface enclosed internally within the display apparatus. In sonic embodiments, when the central flexible display panel 100 is in the curved configuration, the first supporting connector 510 and the second supporting connector 520 connect the first peripheral display panel 200 and the second peripheral display panel 200, forming a ring structure, e.g., a flat ring shaped structure as shown in FIG. 6. In this operating state, all light emitting surfaces of the display apparatus are enclosed internally within the display apparatus, preventing damages on the light emitting surfaces from external force, e.g., during transportation. Any appropriate method for connecting the first supporting connector 510 and the second supporting connector 520 may be practiced. For example, the first supporting connector 510 and the second supporting connector 520 may be connected by an adhesive, a snap hook, a magnet, a double-sided adhesive tape, a hook and loop fastener, etc.

Figure 5:
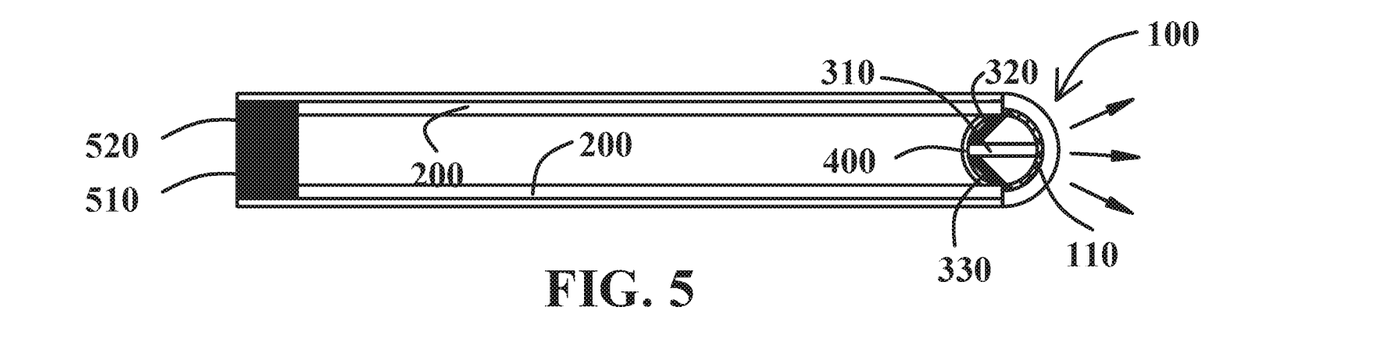
FIG. 5 is a diagram illustrating a display apparatus in a third configuration in some embodiments.

In some embodiments, two light emitting surfaces of the display apparatus are on different sides of the display apparatus. For example, the light emitting surface of the central flexible display panel 100 and a light emitting surface of the peripheral display panel 200 may be on different sides of the display apparatus. Referring to FIG. 5, the light emitting surfaces of the peripheral display panels are enclosed internally within the display apparatus, whereas the light emitting surface of the central flexible display panel 100 is exposed externally for image display. In this operating state, the display apparatus may provide real time notifications to a user without the need of displaying on other light emitting surfaces (e.g., the internally enclosed light emitting surfaces). This design enables a user to view SMS messages or push notification messages instantly when it is inconvenient for the user to check these messages (e.g., during a meeting).

Figure 7:
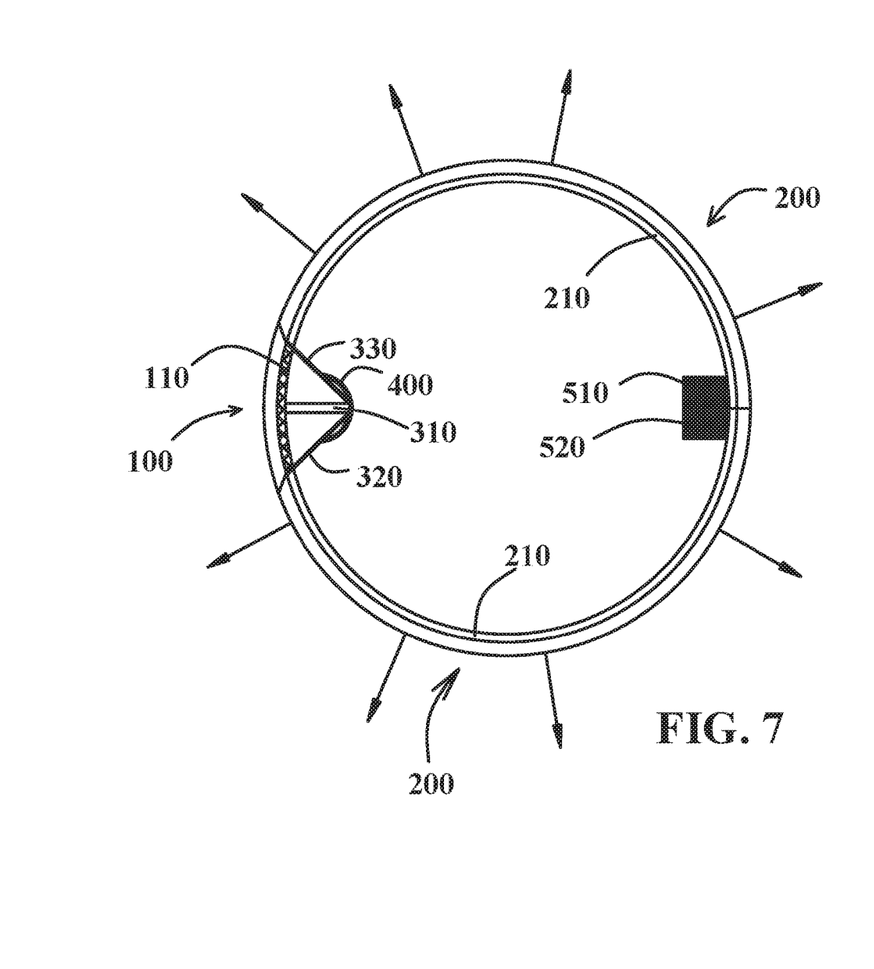
FIG. 7 is a diagram illustrating a display apparatus in a fifth configuration in some embodiments.

In some embodiments, the peripheral display panel 200 (e.g., the first peripheral display panel 200 and the second peripheral display panel 200) is also a flexible display panel having a flat configuration in which the peripheral display panel 200 is substantially flat and a curved configuration in which the peripheral display panel 200 is curved. When the central flexible display panel 100, the first peripheral display panel 200, and the second peripheral display panel 200 are all in the curved configuration, the first supporting connector 510 and the second supporting connector 520 may be connected to each other side-by-side. The first supporting connector 510 and the second supporting connector 520 connect the first peripheral display panel 200 and the second peripheral display panel 200 as shown in FIG. 7. In this operating state, the central flexible display panel 100, the first peripheral display panel 200, and the second peripheral display panel 200 form a substantially cylindrical structure. The light emitting surfaces of the central flexible display panel 100, the first peripheral display panel 200, and the second peripheral display panel 200 form a substantially cylindrical surface.

Figure 9:
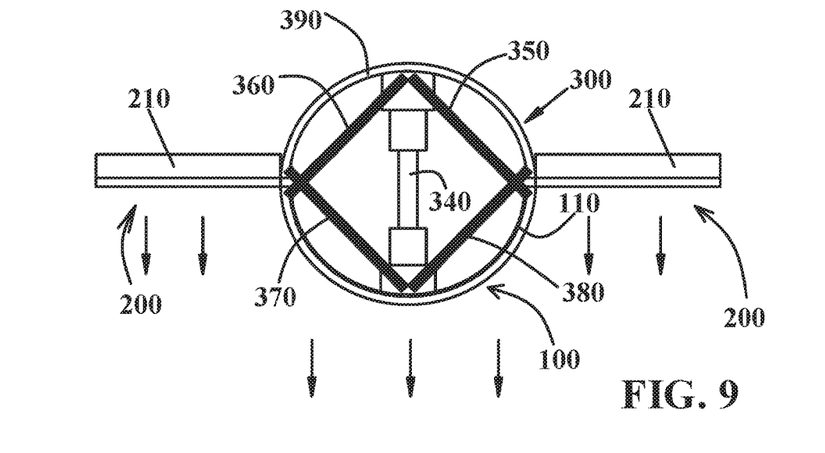
FIG. 9 is a diagram illustrating a display apparatus in a first configuration in some embodiments.
Figure 10:
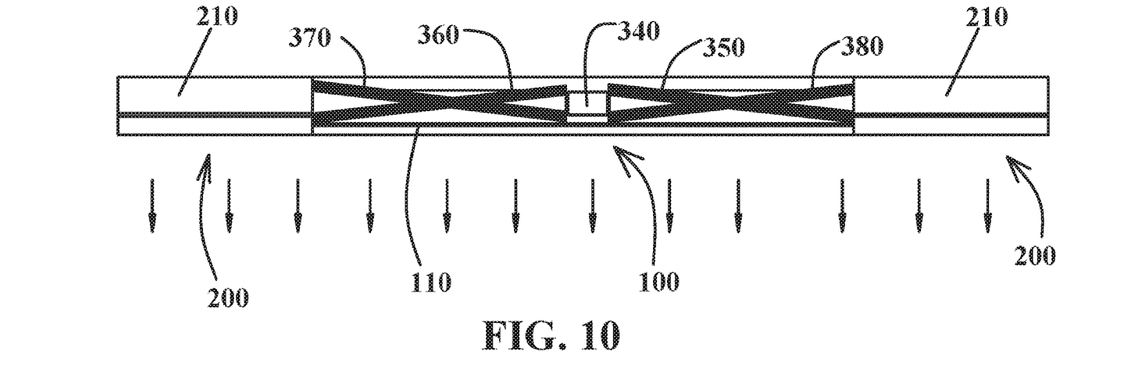
FIG. 10 is a diagram illustrating a display apparatus in a second configuration in some embodiments.

FIGS. 9-10 are diagrams illustrating some display apparatuses in some embodiments. Referring to FIGS. 9-10, the driving mechanism 300 includes two folding arms (a first folding arm and a second folding arm (i.e., an ancillary folding arm)) and a retractable shaft 340 for deforming the central flexible display panel 100 between the flat configuration and the curved configuration. The ancillary folding arm has a third arm section 370 and a fourth arm section 380. The third arm section 370 and the fourth arm section 380 form an additional included angle. Similar to the folding arm discussed in FIGS. 1-8, the ancillary folding arm is capable of having a third included angle corresponding to the central flexible display panel 100 in the flat configuration and a fourth included angle corresponding to the central flexible display panel 100 in the curved configuration. In FIGS. 9-10, the included angle controller 340 is a retractable shaft 340, the retractable shaft 340 controls an included angle of the folding arm and an additional included angle of the ancillary folding arm simultaneously. The display apparatus further includes a flexible shell 390 facing the central flexible display panel 100 and covering an end of the retractable shaft 340. The flexible shell 390 is capable of undergoing deformation between a flat configuration in which the flexible shell 390 is substantially flat and a curved configuration in which the flexible shell 390 is curved. The flat configuration of the flexible shell 390 corresponds to the flat configuration of the central flexible display panel 100, the curved configuration of the flexible shell 390 corresponds to the curved configuration of the central flexible display panel 100.

The retractable shaft 340 has a first end and a second end. The first end is connected with a central portion of the flexible shell 390, and the second end is connected with a central portion of the central flexible display panel 100. The folding arm includes a first arm section 350 and a second arm section 360, each of which having a first terminal and a second terminal. The first terminal of the first arm section 350 is connected to the second end of the retractable shaft 340 or a portion of the flexible shell 390 proximal to the retractable shaft 340. The second terminal of the first arm section 350 is connected to the central flexible display panel 100 on a side distal to a light emitting surface of the central flexible display panel 100. The first terminal of the second arm section. 360 is connected to the second end of the retractable shaft 340 or a portion of the flexible shell 390 proximal to the retractable shaft 340. The second terminal of the second arm section 360 is connected to the central flexible display panel 100 on a side distal to a light emitting surface of the central flexible display panel 100. The second terminals of the first arm section 350 and the second arm section 360 are coupled to the central flexible display panel 100 at two different (e.g., opposite) margins of the central flexible display panel 100, respectively.

The ancillary folding arm includes a third arm section 370 and a fourth arm section 380, each of which having a third terminal and a fourth terminal. The third terminal of the third arm section 370 is connected to the first end of the retractable shaft 340 or a portion of the central flexible display panel 100 proximal to the retractable shaft 340. The fourth terminal of the third arm section 370 is connected to the flexible shell 390. The third terminal of the fourth arm section 380 is connected to the first end of the retractable shaft 340 or a portion of the central flexible display panel 100 proximal to the retractable shaft 340. The fourth terminal of the fourth arm section 380 is connected to the flexible shell 390. The fourth terminals of the third arm section 370 and the fourth arm section 380 are coupled to the flexible shell 390 at two different (e.g., opposite) margins of the flexible shell 390, respectively. The two different margins of the flexible shell 390 are secured to two peripheral display panel 200 on two sides of the central flexible display panel 100, respectively. The flexible shell 390 and the central flexible display panel 100 encloses the folding arm, the ancillary folding arm, and the retractable shaft 340 when the central flexible display panel 100 is in the curved configuration. The retractable shaft 340 is capable of having a retracted state corresponding to the central flexible display panel 100 in the flat configuration and an extended state corresponding to the central flexible display panel 100 in the curved configuration, In the operating state as shown in FIG. 9, the retractable shaft 340 is in an extended state. The flexible shell 390 and the central flexible display panel 100 are both in the curved configuration. In the operating state as shown in FIG. 10, the retractable shaft 340 is in a retracted state. The flexible shell 390 and the central flexible display panel 100 are both in the flat configuration.

In FIG. 9, the first terminals of the first arm section 350 and the second arm section 360 are connected to the second end of the retractable shaft 340. Optionally, the first terminals of the first arm section 350 and the second arm section 360 are connected to a portion of the flexible shell 390 proximal to the retractable shaft 340.

When the first terminal of the first arm section 350 is connected to the second end of the retractable shaft 340, the first arm section 350 is attached onto the retractable shaft 340 in a way such that the extension and retraction of the retractable shaft 340 is not affected by the attachment of the first arm section 350 in any significant manner. Similarly, when the first terminal of the second arm section 360 is connected to the second end of the retractable shaft 340, the second arm section 360 is attached onto the retractable shaft 340 in a way such that the extension and retraction of the retractable shaft 340 is not affected by the attachment of the second arm section 360 in any significant manner.

In FIG. 9, the third terminals of the third arm section 370 and the fourth arm section 380 are connected to the first end of the retractable shaft 340. Optionally, the third terminals of the third arm section 370 and the fourth arm section 380 are connected to a portion of the central flexible display panel 100 proximal to the retractable shaft 340.

When the third terminal of the third arm section 370 is connected to the first end of the retractable shaft 340, the third arm section 370 is attached onto the retractable shaft 340 in a way such that the extension and retraction of the retractable shaft 340 is not affected by the attachment of the third arm section 370 in any significant manner. When the fourth terminal of the third arm section 370 is connected to a portion of the central flexible display panel 100 proximal to the retractable shaft 340, the third arm section 370 is attached onto the central flexible display panel 100 in a way such that the display function of the central flexible display panel 100 is not affected by the attachment of the third arm section 370 in any significant manner. Similarly, when the third terminal of the fourth arm section 380 is connected to the first end of the retractable shaft 340, the fourth arm section 380 is attached onto the retractable shaft 340 in a way such that the extension and retraction of the retractable shaft 340 is not affected by the attachment of the fourth arm section 380 in any significant manner. When the fourth terminal of the fourth arm section 380 is connected to a portion of the central flexible display panel 100 proximal to the retractable shaft 340, the fourth arm section 380 is attached onto the central flexible display panel 100 in a way such that the display function of the central flexible display panel 100 is not affected by the attachment of the fourth arm section 380 in any significant manner.

To facilitate the attachment of the driving mechanism 300, the central flexible display panel 100 optionally includes a first backplate 110 on a side of the central flexible display panel 100 distal to the light emitting surface of the central flexible display panel 100. The first backplate 110 is a flexible first backplate 110. Thus, in the context of attaching the driving mechanism 300 onto the central flexible display panel 100, a side of the central flexible display panel 100 distal to the light emitting surface of the central flexible display panel 100 may refer to a side of the first backplate 110 distal to the central flexible display panel 100. Optionally, the first backplate 110 supports and protects the circuits within the central flexible display panel 100.

Optionally, the second end of the retractable shaft 340 is connected to a central portion of the first backplate 110 on a side of the first backplate 110 distal to the central flexible display panel 100 (FIGS. 1-7). Optionally, the second terminal of the first arm section 320 is connected to a side of the first backplate 110 distal to the central flexible display panel 100, the second terminal of the second arm section 330 is connected to a side of the first backplate 110 distal to the central flexible display panel 100, and the second terminal of the first arm section 320 and the second terminal of the second arm section 330 are connected to the first backplate 110 at two different margins of the first backplate 110, respectively (FIGS. 1-7).

Optionally, the second terminal of the first arm section 350 is connected to a side of the first backplate 110 distal to the central flexible display panel 100, the second terminal of the second arm section 360 is connected to a side of the first backplate 110 distal to the central flexible display panel 100, and the second terminal of the first arm section 350 and the second terminal of the second arm section 360 are connected to the first backplate 110 at two different margins of the first backplate 110, respectively (FIGS. 9-10). Optionally, the second end of the retractable shaft 340 is secured to a central portion of the first backplate 110 on a side of the first backplate 110 distal to the central flexible display panel 100 (FIGS. 9-10). Optionally, the third arm section 370 is connected to the first backplate 110. Optionally, the fourth arm section 380 is connected to the first backplate 110.

Optionally, the peripheral display panel 200 includes a second backplate 210 on a side of the peripheral display panel 200 distal to the light emitting surface of the peripheral display panel 200. Optionally, the flexible shell 390 is connected to the second backplate 210. The second backplate 210 facilitates the attachment of the flexible shell 390. Optionally, the second backplate 210 supports and protects the circuits within the peripheral display panel 100.

Optionally, the peripheral display panel 200 is a rigid display panel. Optionally, the second backplate 210 is a rigid backplate. Optionally, the peripheral display panel 200 is a flexible display panel. Optionally, the second backplate 210 is a flexible backplate.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does riot imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
    a flexible display panel capable of undergoing deformation between a flat configuration in which the flexible display panel is substantially flat and a curved configuration in which the flexible display panel is curved; and
    a first arm section and a second arm section for deforming the flexible display panel between the flat configuration and the curved configuration;
    wherein each of the first arm section and the second arm section comprises a first terminal and a second terminal, the first terminal of the first arm section and the first terminal of the second arm section coupled to each other, and the second terminal of the first arm section and the second terminal of the second arm section coupled to the flexible display panel on a side distal to a light emitting surface of the flexible display panel and at two opposite margins of the flexible display panel, respectively;
    the first arm section and the second arm section constitute a folding arm for deforming the flexible display panel between the flat configuration and the curved configuration, the first arm section and the second arm section forming an included angle, the folding arm is capable of having a first included angle corresponding to the flexible display panel in the flat configuration and a second included angle corresponding to the flexible display panel in the curved configuration;

wherein the display apparatus further comprises an included angle controller for adjusting an included angle of the folding arm thereby deforming the flexible display panel; and wherein the included angle controller comprises a retractable shaft capable of having a retracted state corresponding to the flexible display panel in the flat configuration and an extended state corresponding to the flexible display panel in the curved configuration; the retractable shaft comprises a first end coupled to the first arm section and the second arm section, and a second end coupled to the flexible display panel at a side of the flexible display panel distal to a light emitting surface.

2. The display apparatus of claim 1, further comprising at least one peripheral display panel abutting the flexible display panel along at least one edge of the flexible display panel.

3. The display apparatus of claim 1, further comprising at least one peripheral display panel abutting the flexible display panel along at least one edge of the flexible display panel, the flexible display panel and the at least one peripheral display panel are substantially planar when the first arm section and the second arm section are in an extended state.

4. The display apparatus of claim 1, the flexible display panel is curved and has a partial cylindrical surface when the first arm section and the second arm section are in a retracted state.

5. The display apparatus of claim 1, further comprising a protective shell facing the flexible display panel and covering the first end of the retractable shaft; the protective shell and the flexible display panel enclosing the folding arm and the retractable shaft when the flexible display panel is in the curved configuration.

6. The display apparatus of claim 1, comprising a first peripheral display panel and a second peripheral display panel abutting the flexible display panel on two opposite edges of the flexible display panel in plan view of the flexible display panel, respectively; and a first supporting connector and a second supporting connector for connecting the first peripheral display panel and the second peripheral display panel when the flexible display panel in the curved configuration and for supporting the display apparatus on a surface when the flexible display panel in the flat configuration;

wherein the first supporting connector is in a margin portion of the first peripheral display panel distal to the flexible display panel, the second supporting connector is in a margin portion of the second peripheral display panel distal to the flexible display panel, and the first supporting connector and the second supporting connector are on a same surface of the display apparatus when the flexible display panel in the flat configuration.

7. The display apparatus of claim 6, a light emitting surface of the flexible display panel is on a same side of the display apparatus as light emitting surfaces of the first peripheral display panel and the second peripheral display panel.

8. The display apparatus of claim 6, a light emitting surface of the flexible display panel is on a different side of the display apparatus from light emitting surfaces of the first peripheral display panel and the second peripheral display panel.

9. The display apparatus of claim 1, wherein the first terminals of the first arm section and the second arm section coupled to each other through the first end of the retractable shaft.

10. The display apparatus of claim 1, wherein the first arm section is a retractable arm section capable of retracting and extending between the first terminal and the second terminal of the first arm section, having an extended state corresponding to the flexible display panel in a flat configuration and a retracted state corresponding to the flexible display panel in a curved configuration; and the second arm section is a retractable arm section capable of retracting and extending between the first terminal and the second terminal of the second arm section, having an extended state corresponding to the flexible display panel in the flat configuration and a retracted state corresponding to the flexible display panel in the curved configuration.

11. A display apparatus, comprising:

a flexible display panel capable of undergoing deformation between a flat configuration in which the flexible display panel is substantially flat and a curved configuration in which the flexible display panel is curved; and a first arm section and a second arm section for deforming the flexible display panel between the flat configuration and the curved configuration;

wherein each of the first arm section and the second arm section comprises a first terminal and a second terminal, the first terminal of the first arm section and the first terminal of the second arm section coupled to each other, and the second terminal of the first arm section and the second terminal of the second arm section coupled to the flexible display panel on a side distal to a light emitting surface of the flexible display panel and at two opposite margins of the flexible display panel, respectively;

wherein the first arm section and the second arm section constitute a folding arm for deforming the flexible display panel between the flat configuration and the curved configuration, the first arm section and the second arm section forming an included angle, the folding arm is capable of having a first included angle corresponding to the flexible display panel in the flat configuration and a second included angle corresponding to the flexible display panel in the curved configuration;

wherein the display apparatus further comprises:

an included angle controller for adjusting an included angle of the folding arm thereby deforming the flexible display panel; and an ancillary folding arm comprising a third arm section and a fourth arm section for deforming the flexible display panel between the flat configuration and the curved configuration, the third arm section and the fourth arm section forming an additional included angle, the ancillary folding arm is capable of having a third included angle corresponding to the flexible display panel in the flat configuration and a fourth included angle corresponding to the flexible display panel in the curved configuration; the included angle controller controlling an included angle of the folding arm and an additional included angle of the ancillary folding arm simultaneously; the included angle controller comprising a retractable shaft capable of having a retracted state corresponding to the flexible display panel in the flat configuration and an extended state corresponding to the flexible display panel in the curved configuration, the retractable shaft comprises a first end coupled to the first arm section and the second arm section, and a second end coupled to the flexible display panel at a side of the flexible display panel distal to a light emitting surface; the first terminals of the first arm section and the second arm section coupled to each other through the first end of the retractable shaft.

12. The display apparatus of claim 11, wherein the folding arm comprises a first arm section and a second arm section, each of which having a first terminal and a second terminal, the first terminals coupled to the retractable shaft and the second terminals coupled to the flexible display panel on a side distal to a light emitting surface of the flexible display panel, the second terminal of the first arm section and the second terminal of the second arm section coupled to the flexible display panel at two opposite margins of the flexible display panel, respectively;

the ancillary folding arm comprises a third arm section and a fourth arm section, each of which having a third terminal and a fourth terminal, the third terminals coupled to the retractable shaft and the fourth terminals coupled to the flexible display panel on a side distal to a light emitting surface of the flexible display panel, the fourth terminal of the third arm section and the fourth terminal of the fourth arm section coupled to the flexible display panel at two opposite margins of the flexible display panel, respectively; and the retractable shaft has a first end coupled to the first terminals of the first arm section and the second arm section; and a second end coupled to the third terminals of the third arm section and the fourth arm section, and the flexible display panel at a side of the flexible display panel distal to a light emitting surface.

13. The display apparatus of claim 11, further comprising a flexible shell facing the flexible display panel and covering the first end of the retractable shaft; the flexible shell and the flexible display panel enclosing the folding arm, the ancillary folding arm, and the retractable shaft when the flexible display panel is in the curved configuration, the flexible shell capable of undergoing deformation between a flat configuration in which the flexible shell is substantially flat and a curved configuration in which the flexible shell is curved; the flat configuration of the flexible shell corresponding to the flat configuration of the flexible display panel, the curved configuration of the flexible shell corresponding to the curved configuration of the flexible display panel;

the folding arm comprises a first arm section and a second arm section, each of which having a first terminal and a second terminal, the first terminal coupled to the retractable shaft and the second terminal coupled to the flexible display panel on a side distal to a light emitting surface of the flexible display panel, the second terminals of the first arm section and the second arm section coupled to the flexible display panel at two opposite margins of the flexible display panel, respectively;

the ancillary folding arm comprises a third arm section and a fourth arm section, each of which having a third terminal and a fourth terminal, the third terminal coupled to the retractable shaft and the fourth terminal coupled to the flexible shell, the fourth terminals of the third arm section and the fourth arm section coupled to the flexible shell at two opposite margins of the flexible shell, respectively; and the retractable shaft has a first end coupled to the first terminals of the first arm section and the second arm section, and the flexible shell on a side proximal to the flexible display panel; and a second end coupled to the third terminals of the third arm section and the fourth arm section, and the flexible display panel at a side of the flexible display panel distal to a light emitting surface.

14. The display apparatus of claim 13, wherein the first terminals of the first arm section and the second arm section coupled to the retractable shaft by attaching to portions of the flexible shell proximal to the retractable shaft.

15. The display apparatus of claim 13, wherein the third terminals of the third arm section and the fourth arm section coupled to the retractable shaft by attaching to portions of the flexible display panel proximal to the retractable shaft on a side distal to the light emitting surface of the flexible display panel.

16. The display apparatus of claim 13, further comprising at least one peripheral display panel abutting the flexible display panel along at least one edge of the flexible display panel, wherein the at least one peripheral display panel comprises a peripheral backplate on a side distal to a light emitting surface of the at least one peripheral display panel, the flexible shell connected to the at least one peripheral backplate.

17. The display apparatus of claim 11, wherein the first arm section is a retractable arm section capable of retracting and extending between the first terminal and the second terminal of the first arm section, having an extended state corresponding to the flexible display panel in a flat configuration and a retracted state corresponding to the flexible display panel in a curved configuration; and the second arm section is a retractable arm section capable of retracting and extending between the first terminal and the second terminal of the second arm section, having an extended state corresponding to the flexible display panel in the flat configuration and a retracted state corresponding to the flexible display panel in the curved configuration.

* * * * *